United States Patent
Lyon

(10) Patent No.: US 6,550,166 B1
(45) Date of Patent: Apr. 22, 2003

(54) LICENSE PLATE FRAME AND METHOD OF USE

(76) Inventor: Michael E. Lyon, 1515 S. Center, Redlands, CA (US) 92373

( * ) Notice: Subject to any disclaimer, the term of this patent is extended or adjusted under 35 U.S.C. 154(b) by 0 days.

(21) Appl. No.: 09/631,752

(22) Filed: Aug. 3, 2000

Related U.S. Application Data

(63) Continuation-in-part of application No. 29/125,589, filed on Jun. 26, 2000, now Pat. No. Des. 437,815.

(51) Int. Cl.$^7$ ................................................ G09F 7/00
(52) U.S. Cl. ............................................ 40/209; 40/791
(58) Field of Search .......................... 40/209, 790, 791

(56) References Cited

U.S. PATENT DOCUMENTS

| | | | |
|---|---|---|---|
| 3,129,942 A | * 4/1964 | Calverley | ................... 40/792 |
| 4,170,838 A | 10/1979 | Bott | |
| D331,217 S | 11/1992 | Spencer | |
| 5,428,911 A | * 7/1995 | Figone et al. | ................. 40/209 |
| 5,881,484 A | * 3/1999 | Carroll | ................... 40/661.03 |
| 5,950,339 A | * 9/1999 | Lucier | ........................ 40/209 |
| D428,374 S | 7/2000 | Steinhagen | |

* cited by examiner

Primary Examiner—Cassandra H. Davis
(74) Attorney, Agent, or Firm—Eric Karich

(57) ABSTRACT

A license plate frame for use, in combination, with a toy license plate, includes upper and lower horizontally extending sections and vertically disposed end sections extending between and integrally connected to the opposite ends of the horizontally extending sections. Each of the horizontally extending sections and end sections has a frontal wall that is substantially parallel to the plane of the license plate frame, and an outer enclosure wall extending rearwardly from the plane of the license plate frame. The frontal walls have a front surface and an opposing rear surface. The front and rear surfaces each terminate at an inner edge and an outer edge. The inner edges cooperate to form a display aperture. An inner frame wall extending rearwardly from the rear surface of each of the frontal walls, between the inner edge and the outer enclosure wall. At least two plate retaining flanges extend inwardly from the inner frame terminal edge. The license plate frame is shaped to receive a toy license plate having a front plate surface printed with a design, such that the design is displayed through the display aperture.

1 Claim, 3 Drawing Sheets

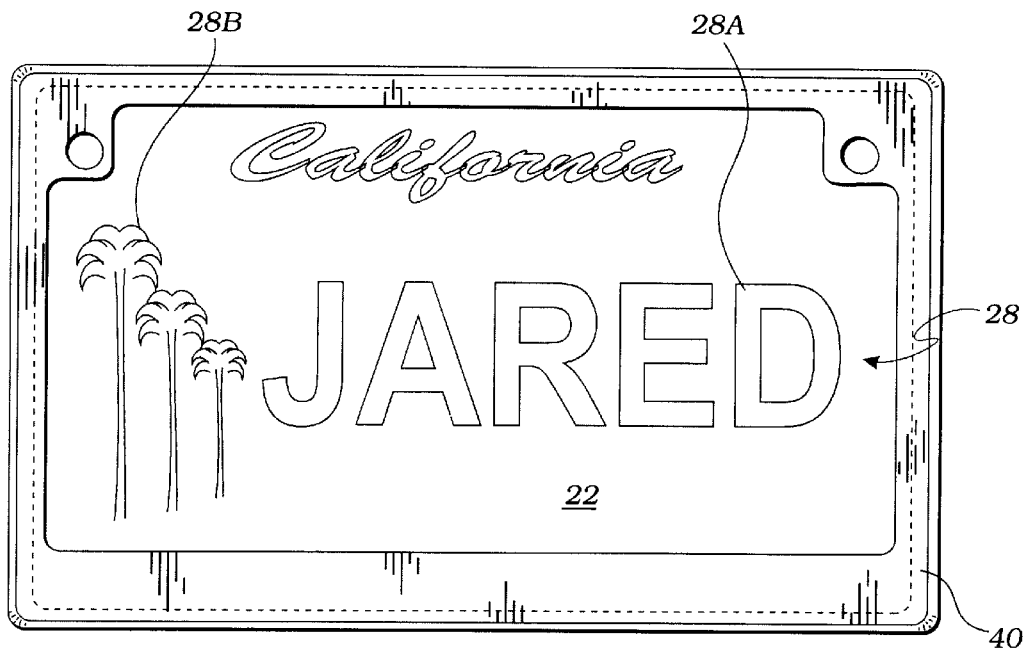
Fig. 4
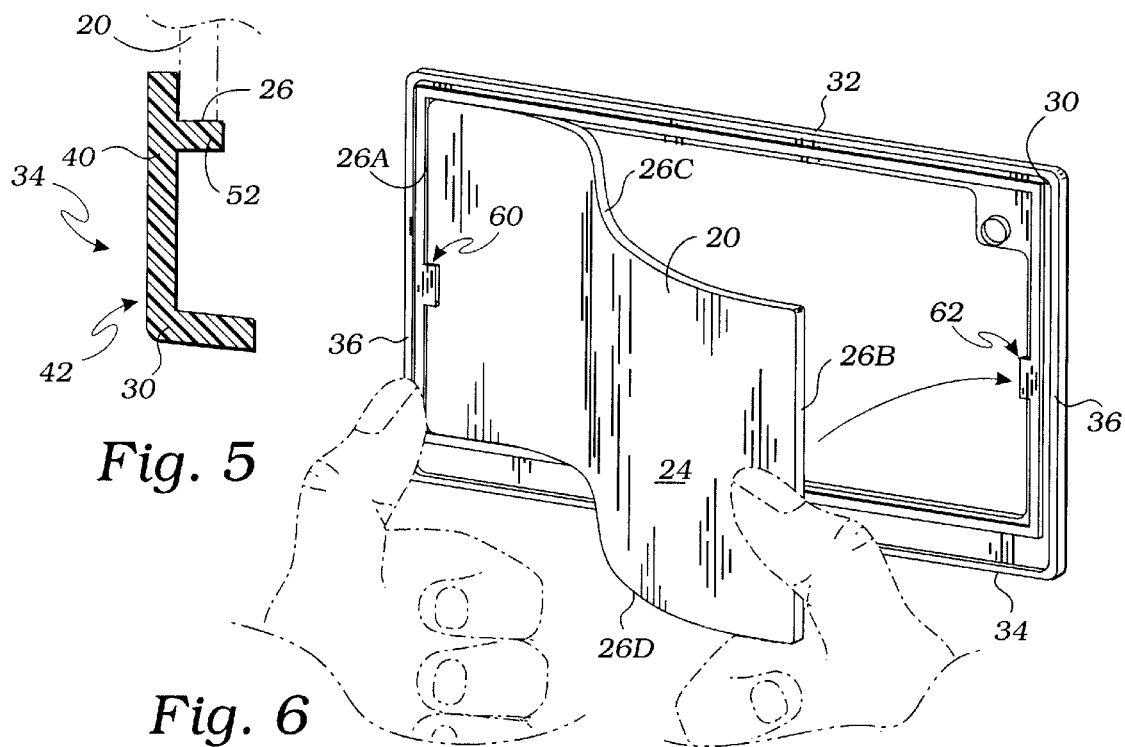
Fig. 5
Fig. 6

LICENSE PLATE FRAME AND METHOD OF USE

CROSS-REFERENCE TO RELATED APPLICATIONS

This application for a utility patent is a continuation-in-part of a previously filed design patent application having the application number 29/125,589, filed Jun. 26, 2000 now U.S. Pat. No. DES. 437,815.

STATEMENT REGARDING FEDERALLY SPONSORED RESEARCH

Not Applicable

BACKGROUND OF THE INVENTION

1. Field of the Invention

This invention relates generally to license plate frames, and more particularly to a license plate frame having a "frame-within-a-frame" that allows a toy license plate to be mounted within the license plate frame without obscuring a design printed on a front plate surface of the toy license plate.

2. Description of Related Art

The prior art includes various license plate frames for holding license plates onto automobiles. The prior art frames tend to be simple frames having a wide and decorative front surface. The license plate and the license plate frame are both attached to an automobile with a simple fastening mechanism such as a pair of screws. Since ordinary license plates include a plain border around the perimeter, it is acceptable for the perimeter of the license plate to be obscured by the wide border of the license plate frame. Examples of such prior art frames are shown in Bott, U.S. Pat. No. 4,170,838, Spencer, U.S. Des. 331,217, and Steinhagen, U.S. Des. 428,374.

Toy license plates are also known in the art. These toys are typically constructed of rectangular plastic sheets that are approximately 2¼ inches by 4 inches. Since the toy license plates are not typically placed in license plate frames, the design printed on their front surface typically extends to the edge of the toy license plate. If the toy license plate is then placed in a frame, a large portion of the design is obscured from view, especially since the license plate frame must have a wide front surface in order to look good.

The prior art teaches toy license plates and license plate frames. However, the prior art does not teach a license plate frame having a "frame-within-a-frame" that allows a toy license plate to be mounted within the license plate frame without obscuring the design printed on the front of the toy license plate. The present invention fulfills these needs and provides further related advantages as described in the following summary.

SUMMARY OF THE INVENTION

The present invention teaches certain benefits in construction and use which give rise to the objectives described below.

The present invention provides a license plate frame for use, in combination, with a toy license plate, includes upper and lower horizontally extending sections and vertically disposed end sections extending between and integrally connected to the opposite ends of the horizontally extending sections. Each of the horizontally extending sections and end sections has a frontal wall that is substantially parallel to the plane of the license plate frame, and an outer enclosure wall extending rearwardly from the plane of the license plate frame. The frontal walls have a front surface and an opposing rear surface. The front and rear surfaces each terminate at an inner edge and an outer edge. The inner edges cooperate to form a display aperture. An inner frame wall extending rearwardly from the rear surface of each of the frontal walls, between the inner edge and the outer enclosure wall. At least two plate retaining flanges extend inwardly from the inner frame terminal edge. The license plate frame is shaped to receive a toy license plate having a front plate surface printed with a design, such that the design is displayed through the display aperture.

A primary objective of the present invention is to provide a license plate frame having advantages not taught by the prior art.

Another objective is to provide a license plate frame having an inner frame wall, a "frame-within-a-frame", to frame the toy license plate without obscuring the design.

A further objective is to provide a license plate frame that provides a visually appealing, well proportioned front surface.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 4 is a front elevational view thereof;

FIG. 5 is a sectional view thereof taken along line 5—5 in FIG. 2; and

FIG. 6 is a rear perspective view illustrating how a toy license plate is inserted into a license plate frame.

DETAILED DESCRIPTION OF THE INVENTION

Figure 1:
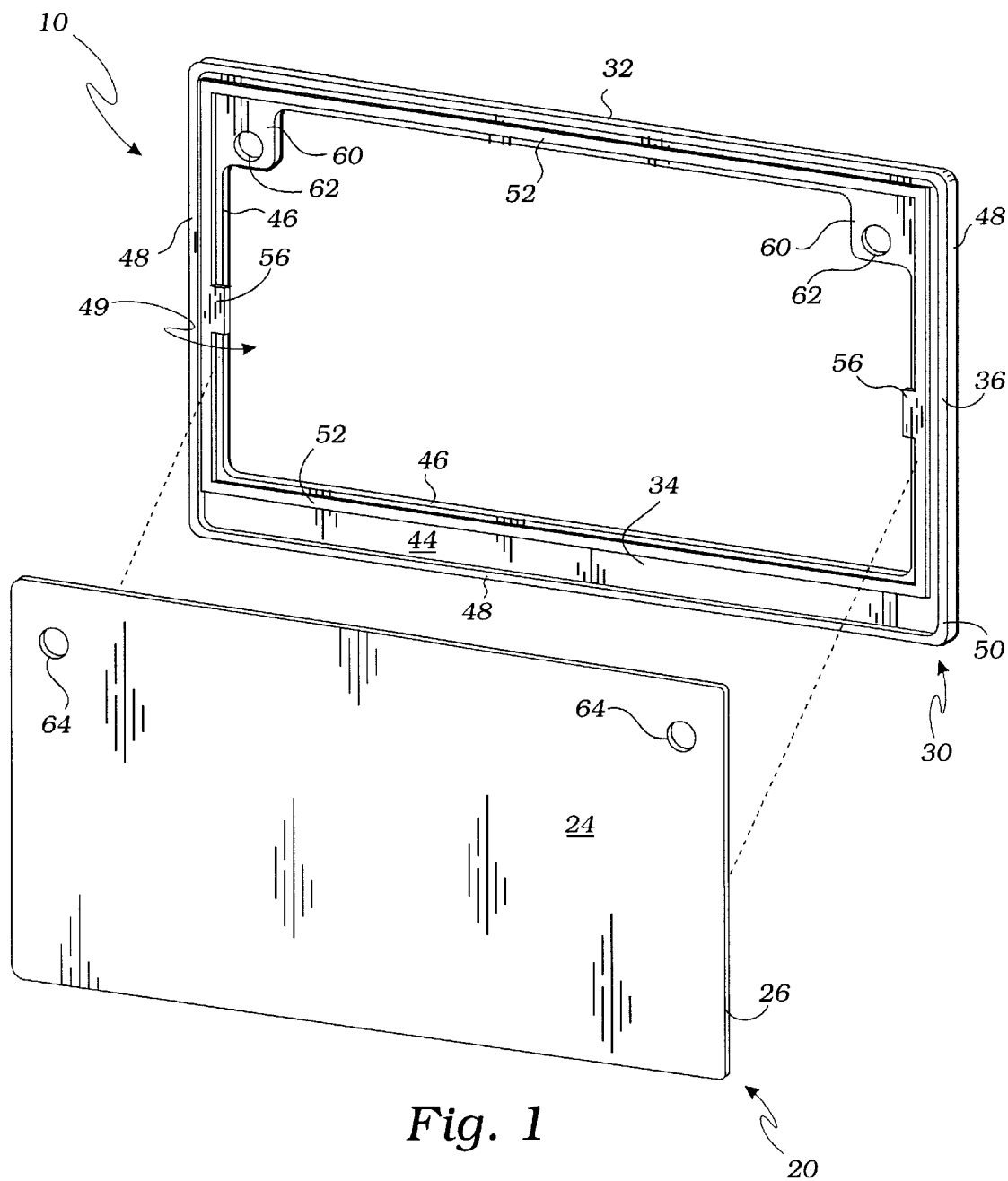
FIG. 1 is an exploded rear perspective view of the preferred embodiment of the present invention.
Figure 2:
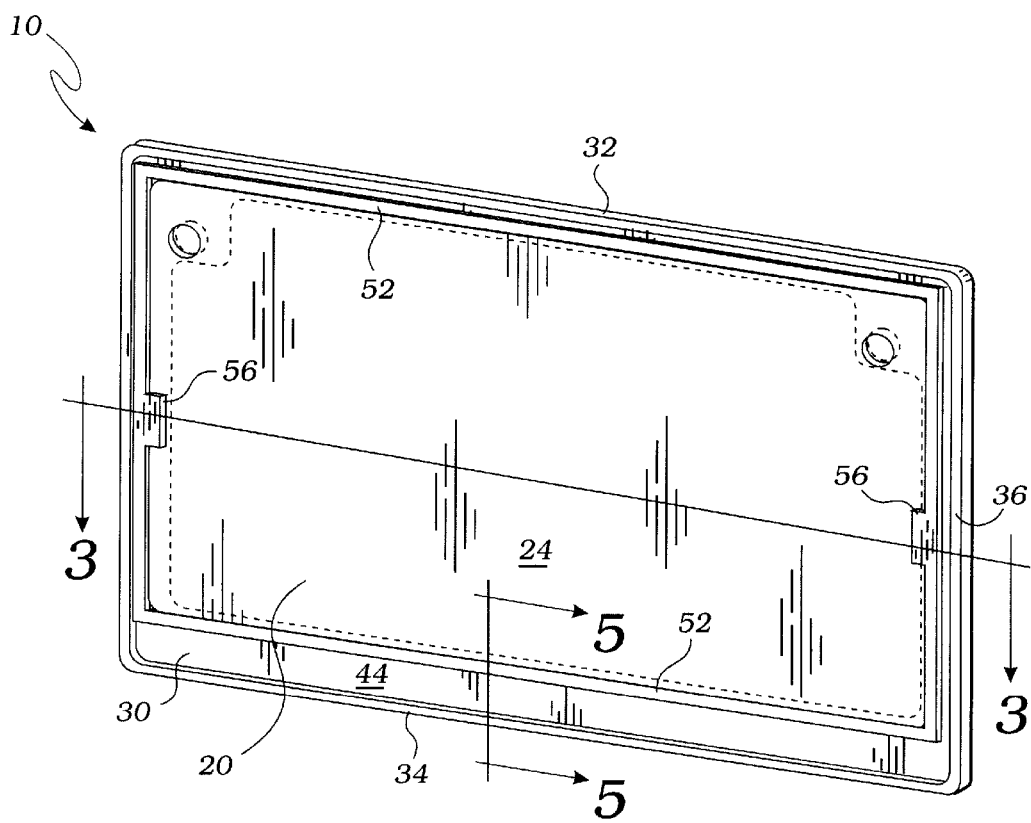
FIG. 2 is a rear perspective view thereof.
Figure 3:
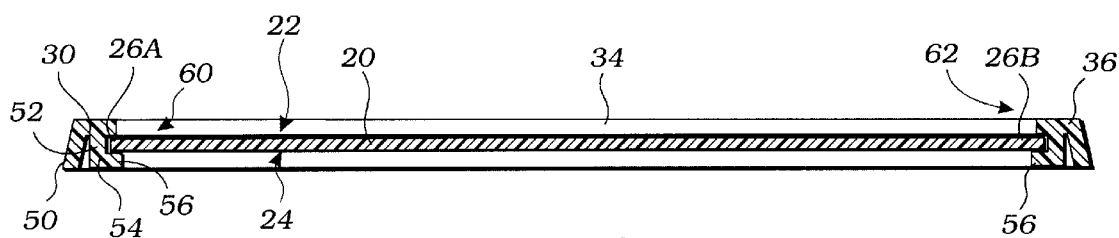
FIG. 3 is a sectional view thereof taken along line 3—3 in FIG. 2.

The above described drawing figures illustrate the invention, a combination 10 that includes a toy license plate 20 and a license plate frame 30. The license plate frame 30 includes a novel "frame-within-a-frame" that, used in combination with the toy license plate 20, enables the display of a design 28 on the toy license plate 20 without having the license plate frame 30 block a portion of the design 28.

As shown in FIGS. 1–6, the license plate frame 30 is generally rectangular in shape and includes upper and lower horizontally extending sections 32 and 34 and vertically disposed end sections 36 extending between and integrally connected to the opposite ends of the horizontally extending sections. Each of the horizontally extending sections 32 and 34 and end sections 36 has a frontal wall 40 that is substantially parallel to the plane of the license plate frame 30, and an outer enclosure wall 50 extending rearwardly from the plane of the license plate frame 30. While we refer to the plane of the frontal wall 40 being substantially parallel to the plane of the license plate frame 30, this relationship is merely meant to be generally descriptive of its orientation rather than a functional physical relationship. Since a planar relationship is preferred, but not required, this limitation should be construed broadly to include various curves and angles that disrupt the planar relationship, as long as the general relationship of the license plate frame 30 is the same with respect to the toy license plate 20.

The frontal walls 40 have a front surface 42 and an opposing rear surface 44. The front and rear surfaces 42 and 44 each terminate at an inner edge 46 and an outer edge 48. The front surface 42 is preferably a visually pleasing frame surface, as shown in Bott, U.S. Pat. No. 4,170,838, Spencer, U.S. Des. 331,217, and Steinhagen, U.S. Des. 428,374, hereby incorporated by reference. Various design features can be devised by those skilled in the art, although a plain frame surface is preferred, as long as the front surface 42 is wide enough to provide a visually pleasing frame for the toy license plate 20. The inner edges 46 cooperate to form a display aperture 49. The outer enclosure walls 50 extend rearwardly from the outer edges 48. These elements of the license plate frame 30 are generally similar to prior art frames.

As shown in FIG. 1, connector portions 60 extends between the horizontally extending portion 32 and each of the vertically disposed end sections 36. A screw aperture 62 is formed through each of the connector portions 60. The toy license plate 20 includes apertures 64 that are shaped to correspond with the screw apertures 62 when the toy license plate 20 is positioned within the license plate frame 30.

The critical novelty of the present invention lies in the formation of an inner frame wall 52 extending rearwardly from the rear surface 44 of each of the frontal walls 40, between the inner edge 46 and the outer enclosure wall 50. The inner frame walls 52 cooperate to form the "frame-within-a-frame" unique to the present invention. The inner frame walls 52 extending rearwardly from the frontal wall 40 and terminate at an inner frame terminal edge 54. At least two plate retaining flanges 56 extend inwardly from the inner frame terminal edge 54. The inner frame walls 52 are preferably integral with the remainder of the license plate frame 30. The license plate frame 30 is preferably a single, integral plastic construction.

As shown in FIGS. 1–6, the toy license plate 20 that is preferably used with the above-described license plate frame 30 preferably includes a front plate surface 22 and an opposing back plate surface 24, the front and back plate surfaces 22 and 24 being connected by a plate terminal edge 26. The plate terminal edge 26 preferably includes a first vertical edge 26A and a second vertical edge 26B, the first and second vertical edges 26A and 26B being connected by first and second horizontal edges 26C and 26D. The front plate surface 22 has a design 28 imprinted thereon, preferably a name 28A, and a state graphic 28B, printed to resemble an ordinary license plate.

The toy license plate 20 is shaped to fit within the license plate frame 30 such that the plate terminal edge 26 contacts the inner frame walls 52, the front plate surface 22 contacts the rear surface 44 of the frontal wall 40, and the back plate surface 24 contacts the at least two plate retaining flanges 56 of the license plate frame 30. In this position, the design 28 of the front plate surface 22 is visible through the display aperture 49. It is critical that the design 28 be visible through the display aperture 49, and it is the use of the inner frame walls 52 that makes this possible. Prior art frames, described above, do not have the inner frame walls 52, and would be forced to rely on the outer enclosure walls 50 to contain the toy license plate 20, in which case the entire width of the frontal wall 40 would obscure the design 28 printed on the toy license plate 20.

The toy license plate 20 preferably includes a pair of screw apertures 64 shaped to receive a screw or other fastening device for fastening the toy license plate 20 to a surface. The license plate frame 30 preferably includes a pair of matching screw apertures 66 shaped to match the pair of screw apertures 64 of the toy license plate 20 and allow the screws to pass through the license plate frame 30 as well as the toy license plate 20, thereby fastening both together and to the surface.

The invention includes the method of displaying the toy license plate 20 using the license plate frame 30 described above. As shown in FIG. 6, the toy license plate 20 is inserted into the license plate frame 30 so that the design 28 is visible through the display aperture 49. To insert the toy license plate 20 into the license plate frame 30, the first vertical edge 26A is inserted into a first recess 60 defined by the inner frame wall 52, the rear surface 44 of the frontal wall 40, and one of the at least two plate retaining flanges 56. The second vertical edge 26B of the toy license plate 20 is then biased towards the first vertical edge 26A, allowing the second vertical edge 26B to be inserted into a second recess 62 defined by the inner frame wall 52, the rear surface 44 of the frontal wall 40, and one of the at least two plate retaining flanges 56. When the bias is released, the natural resilience of the toy license plate 20 causes the toy license plate 20 to return to its normal shape and firmly seat the first and second vertical edges 26A and 26B within the first and second recesses 60 and 62, and leaving the design 28 of the front plate surface 22 visible through the display aperture 49.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A license plate frame adapted for cooperation with a toy license plate having a front plate surface and an opposing back plate surface, the front and back plate surfaces being connected by a plate terminal edge the front plate surface having a design imprinted thereon, the license plate frame comprising:

upper and lower horizontally extending sections and vertically disposed end sections extending between and integrally connected to the opposite ends of the horizontally extending sections to form a generally rectangular shape;

each of the horizontally extending sections and end sections having a frontal wall that is substantially parallel to the plane of the license plate frame, and an outer enclosure wall extending rearwardly from the plane of the license plate frame;

the frontal walls having a front surface and an opposing rear surface, the front and rear surfaces terminating at an inner edge and an outer edge;

the inner edges of the frame sections cooperating to form a display aperture;

the outer enclosure walls extending rearwardly from the outer edges;

an inner frame wall extending rearwardly from the rear surface of each of the frontal walls between the inner edge and the outer enclosure wall, each of the inner frame walls extending rearwardly from the frontal wall and terminating in an inner frame terminal edge;

at least two plate retaining flanges, each of the at least two plate retaining flanges extending inwardly from the inner frame terminal edge;

connector portions extending between the horizontally extending portion and each of the vertically disposed end sections; and a screw aperture formed through each of the connector portions.

\* \* \* \* \*